(12) United States Patent
Lee et al.

(10) Patent No.: US 9,182,867 B2
(45) Date of Patent: Nov. 10, 2015

(54) APPARATUS AND METHOD FOR DETECTING ADJACENT OBJECT AND METHOD OF DRIVING ELECTRONIC DEVICE

(71) Applicant: Anapass Inc., Seoul (KR)

(72) Inventors: Jong Hwa Lee, Seoul (KR); Ha Sun Song, Seoul (KR); Woo Hyoung Seo, Seoul (KR)

(73) Assignee: ANAPASS INC., Seoul (KR)

( * ) Notice: Subject to any disclaimer, the term of this patent is extended or adjusted under 35 U.S.C. 154(b) by 42 days.

(21) Appl. No.: 14/259,304

(22) Filed: Apr. 23, 2014

(65) Prior Publication Data
US 2014/0320451 A1    Oct. 30, 2014

(30) Foreign Application Priority Data
Apr. 25, 2013    (KR) ................ 10-2013-0046245

(51) Int. Cl.
G06F 3/045    (2006.01)
G06F 3/044    (2006.01)

(52) U.S. Cl.
CPC ...................................... G06F 3/044 (2013.01)

(58) Field of Classification Search
CPC ..... G06F 3/0416; G06F 3/044; G06F 3/0488; G06F 2203/04104; G06F 2203/04106; G06F 2203/04111
See application file for complete search history.

(56) References Cited

U.S. PATENT DOCUMENTS

| | | | |
|---|---|---|---|
| 6,262,532 B1* | 7/2001 | Park et al. | 313/585 |
| 7,920,129 B2 | 4/2011 | Hotelling et al. | |
| 2003/0151713 A1* | 8/2003 | Aoki | 349/149 |
| 2005/0007312 A1* | 1/2005 | Tanaka et al. | 345/60 |
| 2008/0012835 A1* | 1/2008 | Rimon et al. | 345/173 |
| 2009/0134777 A1* | 5/2009 | Lee et al. | 313/503 |
| 2010/0033436 A1* | 2/2010 | Lai et al. | 345/173 |
| 2012/0212693 A1* | 8/2012 | Kubota et al. | 349/96 |
| 2013/0009908 A1* | 1/2013 | Kuo | 345/174 |
| 2013/0234739 A1* | 9/2013 | Deng | 324/686 |
| 2013/0249825 A1* | 9/2013 | Kang et al. | 345/173 |
| 2014/0320763 A1* | 10/2014 | Lee et al. | 349/12 |
| 2014/0347320 A1* | 11/2014 | Ribeiro et al. | 345/174 |
| 2015/0070607 A1* | 3/2015 | Usukura et al. | 349/15 |

* cited by examiner

Primary Examiner — Joe H Cheng
(74) Attorney, Agent, or Firm — Paratus Law Group, PLLC (57) ABSTRACT

Provided are an apparatus and method for detecting an adjacent object, and a method of driving an electronic device. The apparatus includes a substrate, a plurality of first electrodes including a plurality of first electrodes disposed to extend in a first direction on one surface of the substrate, a plurality of second electrodes disposed alternately and in parallel with the first electrodes on the surface of the substrate to form capacitors together with the first electrodes, a signal source configured to generate electrical signals, a detector configured to detect current signals output when the electrical signals are applied to the capacitors, and a controller configured to connect the signal source to the first electrodes and the detector to the second electrodes.

34 Claims, 9 Drawing Sheets

APPARATUS AND METHOD FOR DETECTING ADJACENT OBJECT AND METHOD OF DRIVING ELECTRONIC DEVICE

CROSS-REFERENCE TO RELATED APPLICATION

This application claims priority to and the benefit of Korean Patent Application No. 10-2013-0046245, filed on Apr. 25, 2013, the disclosure of which is incorporated herein by reference in its entirety.

BACKGROUND

1. Field of the Invention

The present invention relates to an apparatus and method for detecting an adjacent object, and a method of driving an electronic device.

2. Discussion of Related Art

Sensing methods currently used in touch screens are mainly based on resistive layer sensing, surface acoustic wave (SAW) sensing, and capacitive sensing. Among the sensing methods, capacitive sensing enables multi-touch sensing and has excellent durability, recognizability, etc., and thus being selected as a main input means of portable mobile devices.

A capacitive touch screen senses a change in the amount of charge in capacitive sensors on a touch screen panel caused by a user, thereby recognizing a user input. According to charge accumulation methods, capacitive touch screens are classified into a self-capacitive touch screen and a mutual-capacitive touch screen. In the self-capacitive touch screen, each conductor constitutes one capacitive sensor to form a reference ground or an electrified surface outside a touch screen panel, whereas, in the mutual-capacitive touch screen, two conductors on a touch screen panel constitute opposite electrified surfaces and function as one capacitive sensor.

In a general self-capacitive touch screen, an orthogonal X/Y conductor disposition is used. In this case, each capacitive sensor functions as a line sensor, and thus upon sense of each touch screen, receives only one piece of X-sensing information and one piece of Y-sensing information from an X-line sensor group and a Y-line sensor group, respectively. Therefore, the general self-capacitive touch screen is capable of sensing and tracking a single touch but cannot support multiple touches. Also in a mutual-capacitive touch screen, the orthogonal X/Y conductor disposition is used. However, the mutual-capacitive touch screen differs from the self-capacitive touch screen in that each capacitive sensor is configured in the form of a grid sensor at each position where conductors cross at right angles, and reactions of all grid sensors are separately sensed upon detection of a user input on the touch screen. Since grid sensors correspond to different pairs of X/Y coordinates respectively and provide separate reactions, the mutual-capacitive touch screen may sense and track multiple touches of a user by extracting user input information from a set of X/Y-sensing information received from the set of X/Y grid sensors.

A conductor configuration and a sensing method of a general mutual-capacitive touch screen panel are as follows. First electrodes consisting of conductors extending in one direction and second electrodes consisting of conductors extending in a direction perpendicular to the first electrodes form mutual-capacitive sensors using a dielectric material between the first and second electrodes as a medium. When the distance between first and second electrodes of each pair is d, the area of each electrified surface is a, and the equivalent permittivity of all dielectric materials between electrified surfaces is $\in$, a capacitance C of each of the sensors is defined as $C=\in*a/d$ and has a relationship with an amount Q of charge accumulated in the sensor and a potential difference (voltage) V applied to the two electrodes/electrified surfaces as $Q=CV$. When a user approaches a sensor, interference occurs in an electric field formed between two electrodes and hinders charge from being accumulated in the sensor. Then, the amount of charge accumulated in the sensor is reduced, and as a result, the capacitance of the sensor is reduced. This may be understood as a change of the capacitance resulting from a change in the equivalent permittivity between electrified surfaces caused by approach of the user, but there is actually a physical phenomenon that a part of an electric field between the electrified surfaces is shunted and thus the amount of electrification/accumulated charge is reduced. When an alternating current (AC) voltage source is connected to the first electrode and an AC waveform is applied to one electrified surface, a change $\Delta Q$ in the amount of electrification corresponding to $\Delta Q=C\Delta V$ occurs with respect to C that varies according to the degree of approach of the user, and is converted into a current or voltage by a read-out circuit connected to the second electrode. Information converted in this way is generally subjected to signal processing operations, such as noise filtering, demodulation, analog-to-digital conversion, and accumulation, and then is used in a coordinate tracking algorithm and a gesture recognition algorithm. As a preceding patent relating to such a capacitive touch-sensitive panel, there is U.S. Pat. No. 7,920,129.

According to an existing apparatus and method for detecting an adjacent object, a signal processing operation of an active mode for detecting touch input coordinates and touch strength is performed as is even in an idle mode for waiting for an input of a user. However, when signals are processed in the idle mode for waiting for a touch of a user to switch to the active mode in the same way as in the active mode for detecting touch coordinates and touch strength of a user, unnecessary power consumption increases. By lengthening a refresh rate that is a period for detecting touch coordinates and touch strength, it is possible to reduce power consumption. However, when the refresh rate lengthens, a latency that is a time interval between the moment a touch is made to use a device in the idle mode and the moment the device enters the active mode and reacts lengthens, and reactions to a touch input of a user deteriorate.

To solve this problem, the latency can be reduced by separately configuring driving structures for the active mode and the idle mode. However, the introduction of an additional circuit for the two driving structures leads to an increase in the area of a chip, which goes against the trend of miniaturization and slimness, and may also lead to an increase in unnecessary power consumption.

SUMMARY OF THE INVENTION

The present invention is directed to providing an apparatus and method for detecting an adjacent object which make it possible to rapidly react to an input of a user in an idle mode and enter an active mode.

The present invention is also directed to providing an apparatus and method for detecting an adjacent object in which power consumption in the idle mode for waiting for an input of a user can be reduced.

The present invention is also directed to providing an apparatus and method for detecting an adjacent object which use a driving structure used in the active mode for extracting touch coordinates and touch strength of an object even in the idle mode for waiting for an input of a user, and thus accord with trends toward miniaturization of chips and slimness of electronic devices.

According to an aspect of the present invention, there is provided an apparatus for detecting an adjacent object, including: a substrate; a plurality of first electrodes including at least one 1a electrode and at least one 1b electrode disposed to extend in a first direction on one surface of the substrate; a plurality of second electrodes disposed alternately and in parallel with the first electrodes on the surface of the substrate to form capacitors together with the first electrodes; a signal source configured to generate electrical signals; a detector configured to detect current signals output when the electrical signals are applied to the capacitors; and a controller configured to connect the signal source to the first electrodes and the detector to the second electrodes. The signal source applies signals out of phase with each other to the 1a electrode and the 1b electrode.

According to another aspect of the present invention, there is provided an apparatus for detecting an adjacent object, including: a substrate; a plurality of first electrodes including at least one 1a electrode and at least one 1b electrode disposed to extend in a first direction on one surface of the substrate; a plurality of second electrodes disposed alternately and in parallel with the first electrodes on the surface of the substrate to form capacitors together with the first electrodes; a signal source configured to generate electrical signals; a detector configured to detect current signals output when the electrical signals are applied to the capacitors; and a controller configured to connect the signal source to the first electrodes and the detector to the second electrodes. The signal source applies signals in phase with each other to the 1a electrode and the 1b electrode.

According to another aspect of the present invention, there is provided a method for detecting an adjacent object, comprising: (a) applying electrical signals in phase with each other to at least one 1a electrode and at least one 1b electrode disposed to extend in a first direction on one surface of a substrate; (b) receiving current signals from a plurality of second electrodes disposed alternately and in parallel with the 1a electrode and the 1b electrode on the surface of the substrate to form capacitors together with the 1a electrode and the 1bth electrode; and (c) converting the received current signals into voltage signals to detect an object adjacent to the substrate.

According to another aspect of the present invention, there is provided a method for detecting an adjacent object, comprising: (a) applying electrical signals out of phase with each other to at least one 1a electrode and at least one 1b electrode disposed to extend in a first direction on one surface of a substrate; (b) receiving current signals from a plurality of second electrodes disposed alternately and in parallel with the 1a electrode and the 1b electrode on the surface of the substrate to form capacitors together with the 1a electrode and the 1b electrode; and (c) converting the received current signals into voltage signals to detect an object adjacent to the substrate.

According to another aspect of the present invention, there is provided a method of driving an electronic device, including: (a) applying electrical signals in phase with each other to a plurality of first electrodes disposed to extend in a first direction on one surface of a substrate and receiving current signals from a plurality of second electrodes disposed alternately and in parallel with the first electrodes on the surface of the substrate to detect approach of an object; (b) when approach of an object is detected in step (a), applying electrical signals out of phase with each other to the first electrodes and receiving current signals generated by electric field fluxes formed by the electrical signals out of phase with each other from the second electrodes to detect a touch of the object; and (c) when a touch of the object is detected, driving the electronic device in an active mode.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention are disclosed herein. However, specific structural and functional details disclosed herein are merely representative for purposes of describing the exemplary embodiments of the present invention, and the present invention may be embodied in many alternate forms and should not be construed as limited to the exemplary embodiments of the present invention set forth herein. Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "on" another element, it can be directly on the other element or intervening elements may be present.

As used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, parts or combinations thereof, but do not preclude the presence or addition of one or more other features, integers, steps, operations, elements, parts or combinations thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the drawings illustrating exemplary embodiments of the present invention, sizes, heights, thicknesses, etc. are intentionally exaggerated for convenience of description and ease of understanding, but are not enlarged or downsized according to a ratio. Also, in the drawings, some elements may be intentionally downsized, and other elements may be intentionally enlarged.

Unless otherwise defined, all terms used herein have the same meaning as commonly understood by those of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
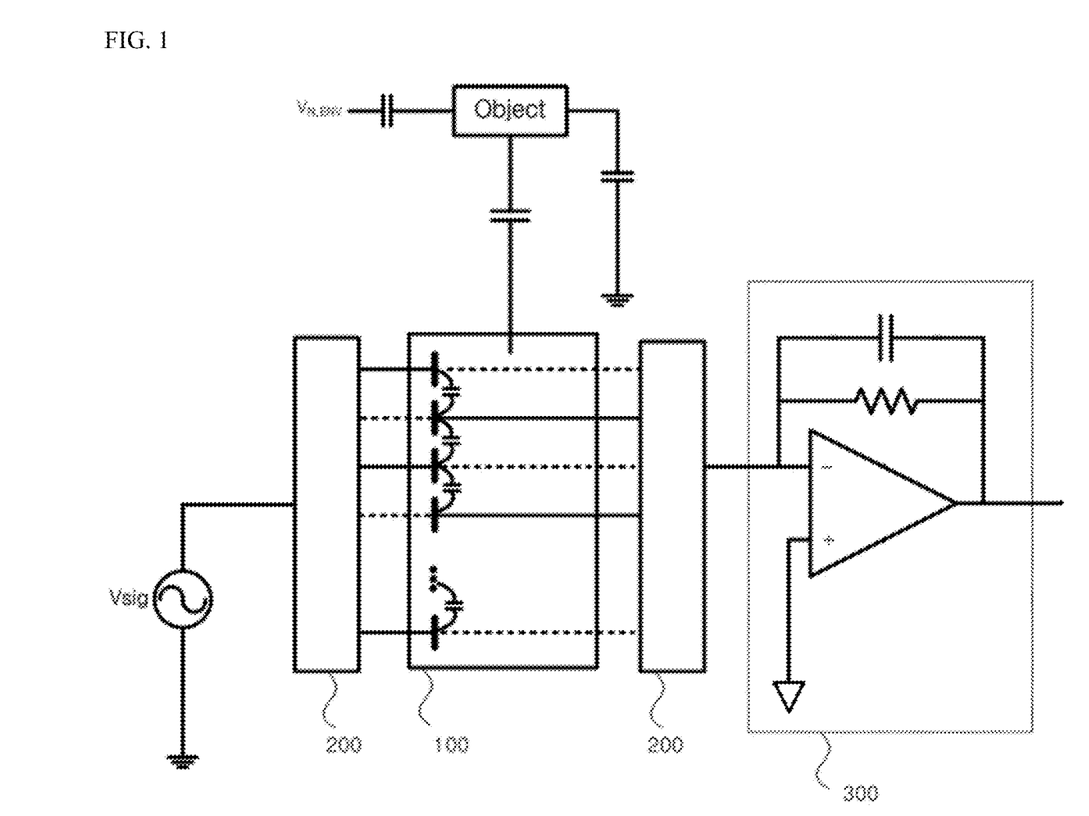
FIG. 1 is a schematic block diagram of an apparatus for detecting an adjacent object according to an exemplary embodiment.
Figure 2:
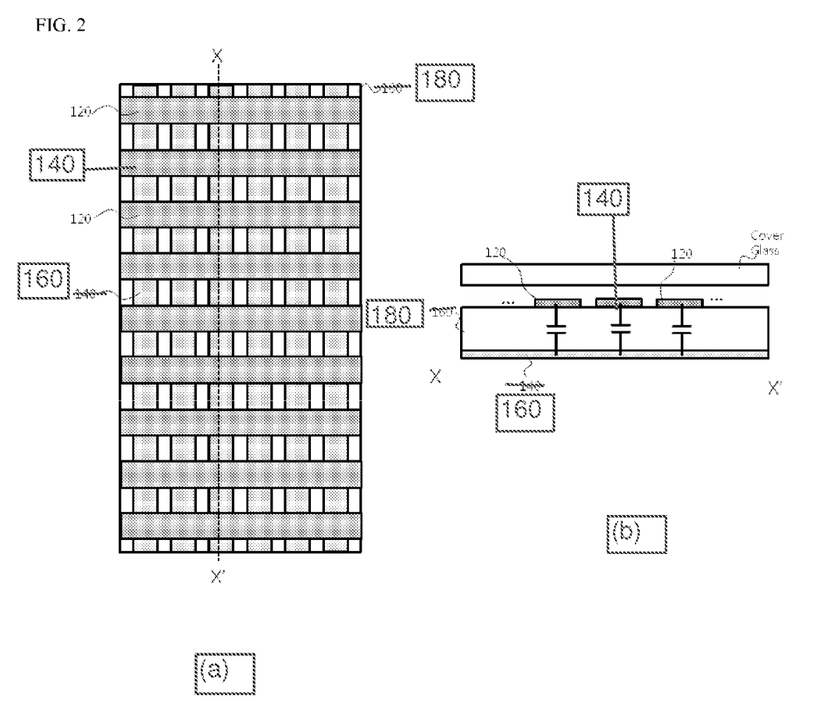
FIG. 2 shows a plurality of first electrodes, second electrodes, and third electrodes disposed on a substrate.

Hereinafter, exemplary embodiments of the present invention will be described with reference to the accompanying drawings. FIG. 1 is a schematic block diagram of an apparatus for detecting an adjacent object according to an exemplary embodiment, and FIG. 2 shows a plurality of first electrodes 120, second electrodes 140, and third electrodes 160 disposed on a substrate 180. Referring to FIGS. 1 and 2, the apparatus for detecting an adjacent object according to the present exemplary embodiment includes a substrate, a plurality of first electrodes 120 including at least one 1a electrode and at least one 1b electrode disposed to extend in a first direction on one surface of the substrate, a plurality of second electrodes 140 disposed alternately and in parallel with the first electrodes 120 on the surface of the substrate to form capacitors together with the first electrodes 120, a signal source Vsig configured to generate electrical signals, a detector 300 configured to detect current signals output when the electrical signals are applied to the capacitors, and a controller 200 configured to connect the signal source Vsig to the first electrodes 120 and the detector 300 to the second electrodes 140. The signal source Vsig applies signals out of phase with each other to the 1a electrode and the 1b electrode.

Both the first electrodes 120 and the second electrodes 140 are used as sensing electrodes in an active mode, in this disclosure, but for clear and brief description of operation in an idle mode, they are referred to as first, 1a, 1b, second, 2a, and 2b electrodes.

In an exemplary embodiment, as shown in FIG. 2B, a cover glass is disposed at a predetermined distance from the upper surface of the substrate 180. The cover glass is formed of glass that has been subjected to a predetermined process, and functions to protect a touch panel 100 disposed on the substrate 180 and transmit an image displayed by a display disposed under the substrate 180 to a user. In another exemplary embodiment, although not shown in the drawings, a cover formed of an opaque material may be on the upper surface of the substrate 180. The described cover and cover glass are formed of a material through which an electric field flux can pass so that electric field fluxes formed by the third electrodes 160 functioning as driving electrodes in the active mode can be shunted by an object O.

Figure 3:
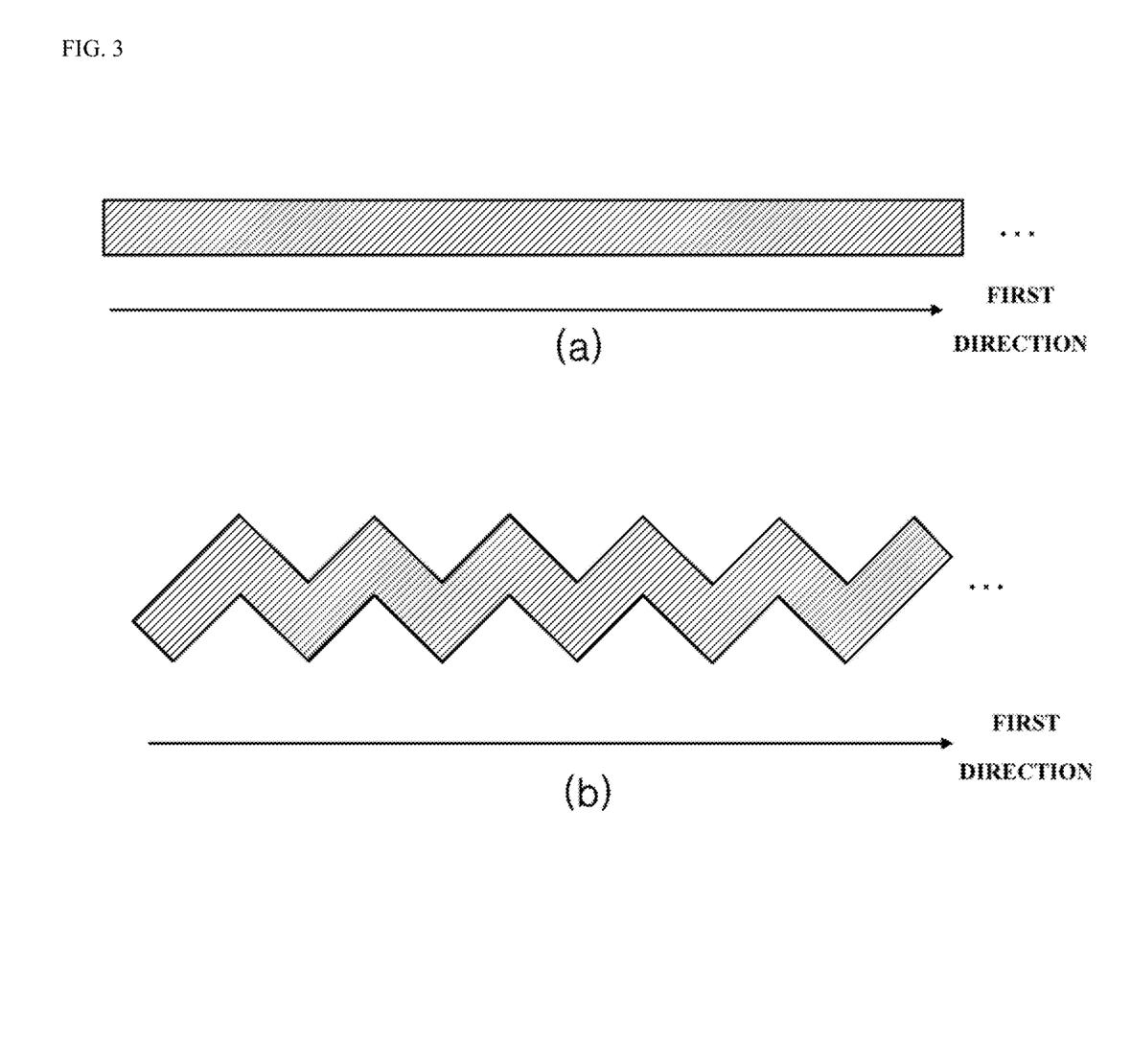
FIG. 3 is a diagram illustrating terms used in the exemplary embodiment.

In this specification, an element referred to as "extending in a first direction" may be formed in a linear shape along the first direction as shown in FIG. 3A, or in a zigzag shape along the first direction as shown in FIG. 3B. Also, although not shown in the drawings, an element referred to as "extending in a first direction" may be formed in a winding shape along the first direction besides a zigzag shape.

An entity with which a user can make an input to a touch panel is defined below as an "object." The object is an entity that can make an input to the touch panel 100 by shunting electric field fluxes formed by the first and second electrodes 120 and 140, such as a finger, a hand, a palm, or a stylus. However, these are merely examples, and an object is not limited thereto.

In this specification, a state in which information, such as touch coordinates, touch strength, and movement speed, is obtained when a user makes a touch with an object is defined as an "active mode." Also, a state in which the apparatus waits for an input because no touch has been made, but there is no object is defined as an "idle mode," and a state in which obtainment of touch information is stopped is defined as a "stop mode."

The substrate 180 is formed of a dielectric material. In an exemplary embodiment, the substrate is formed of a transparent dielectric, a cover glass is formed on the upper surface of the substrate 180 to transmit an image displayed by a display device, such as a liquid crystal display (LCD) or an active matrix organic light emitting diode (AMOLED) display disposed on the lower surface of the substrate 180. For example, the substrate 180 is formed of glass. As will be described later, all the first electrodes 120, the second electrodes 140, and the third electrodes 160 disposed on the substrate 180 may be transparently formed to display an image and also detect an object. In another exemplary embodiment, the substrate 180 can be formed of an opaque dielectric to merely detect a touch of an object.

On the upper surface of the substrate 180, the plurality of first electrodes 120 disposed to extend in the first direction, and the plurality of second electrodes 140 disposed alternately and in parallel with the first electrodes 120 to form capacitors together with the first electrodes 120.

In an exemplary embodiment, on the lower surface of the substrate 180, the third electrodes 160 arranged in parallel with each other are disposed to extend in a second direction perpendicular to the first direction. In the active mode, the third electrodes 160 function as driving electrodes, and form capacitive grid sensors together with the first and second electrodes 120 and 140 that function as sensing electrodes. For example, the first to third electrodes 120, 140, and 160 may be formed of a transparent conductive material to transmit an image displayed by the display device disposed on the lower surface of the substrate 180 as mentioned above. For example, the first to third electrodes 120, 140, and 160 are formed of a transparent material having conductivity such as indium tin oxide (ITO), indium zinc oxide (IZO), aluminium zinc oxide (AZO), or indium cadmium oxide (ICO). In another exemplary embodiment, the first to third electrodes 120, 140, and 160 may be formed of carbon nanotube (CNT). CNT has a higher current density than transparent conductive materials, such as ITO.

In the idle mode, the third electrodes 160 are connected to a low-impedance power source or a ground potential, thereby removing noise emitted from the display device. In the active mode, all the third electrodes 160 other than a third electrode 160 connected to the signal source Vsig to form an electric field flux are connected to the low-impedance power source (not shown) so that noise flowing from the bottom of the substrate 180 is shielded. However, in the idle mode, electric field fluxes are formed between the first electrodes 120 and the second electrodes 140, and thus all the third electrodes 160 are connected to the low-impedance power source, thereby shielding noise flowing from the lower surface of the substrate 180.

The signal source Vsig generates an electrical signal. In an exemplary embodiment, the electrical signal generated by the signal source Vsig is at least one of a step wave, a square pulse, a sinusoidal pulse, a triangular pulse, and a linear superposition thereof. As an example, the signal source Vsig may simultaneously output one electrical signal and an out-of-phase signal having a phase difference of 180 degrees from the electrical signal. As another example, the signal source Vsig may simultaneously output one electrical signal and an in-phase signal having no phase difference from the electrical signal.

The detector 300 is electrically connected to any one electrode of a capacitor formed by a first electrode 120 and a second electrode 140, receives a current signal output from the electrode, and outputs a voltage signal corresponding to the current signal. In an exemplary embodiment, the detector 300 includes a charge amplifier. As an example of the charge amplifier, an operational amplifier has an output terminal fed back to an inverting input terminal and a non-inverting input terminal connected to the ground, and a capacitor and a resistor are connected in parallel with each other in a feedback path. Although the inverting input terminal is not connected to the non-inverting input terminal, the inverting input terminal is kept at the same electric potential as that the non-inverting input terminal due to the virtual short principle of an operational amplifier. Therefore, when the ground potential is applied to the non-inverting input terminal, the inverting input terminal is kept at the ground potential, and when a predetermined potential is applied to the non-inverting input terminal, the inverting input terminal is also kept at the same potential as the non-inverting input terminal. In an exemplary embodiment, a ground voltage is applied to the non-inverting input terminal. In another exemplary embodiment, an electric potential between the electric potential of supplied power and the ground potential is applied to the non-inverting input terminal.

The controller 200 electrically connects the first electrodes 120 with the signal source Vsig, and connects the second electrodes 140 with the detector 300. In an exemplary embodiment, the controller 200 performs switching to connect the first electrodes 120 to the detector 300 and to connect the second electrodes 140 to the signal source Vsig at predetermined periods.

Figure 4:
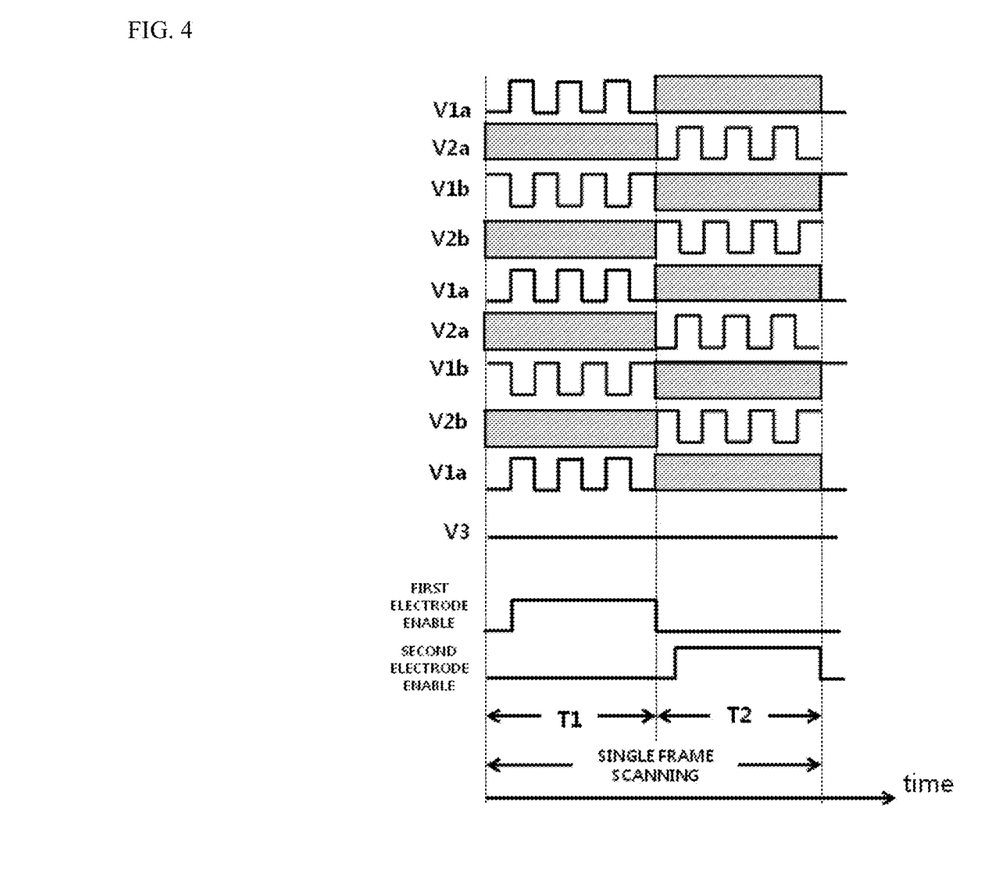
FIG. 4 shows waveforms of signals applied to the first electrodes, the second electrodes, and the third electrodes to detect an object according to an exemplary embodiment.
Figure 5:
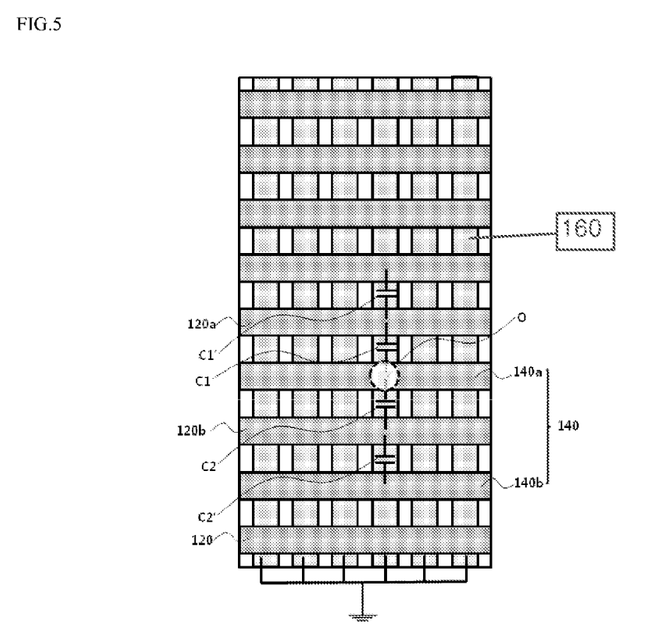
FIG. 5 shows a case in which an object is placed on a touch panel.

With reference to FIGS. 4 and 5, a method of detecting an adjacent object according to an exemplary embodiment will be described. FIG. 4 is a diagram illustrating a method of detecting a touch of an object according to an exemplary embodiment, and FIG. 5 shows a case in which the object O is placed on the touch panel 100. In FIG. 4, waveforms V1a and V1b are waveforms applied to the first and second electrodes 120 and 140 of FIG. 5 respectively, and a waveform V3 denotes that the ground potential is applied to the third electrodes 160. Also, "first electrode enable" denotes a period in which the first electrodes 120 receive an electrical signal from the signal source Vsig and form electric fields, and "second electrode enable" denotes a period in which the second electrodes 140 receive an electrical signal from the signal source Vsig and form electric fields. Grey areas denote periods in which the corresponding electrodes are connected to the detector 300 to perform object sensing.

Referring to FIGS. 4 and 5, the controller 200 divisionally performs frame scanning in two phases T1 and T2. In the first phase T1, the controller 200 electrically connects the first electrodes 120 to the signal source Vsig and the second electrodes 140 to the detector 300 (see grey portions of T1 in FIG. 4). Therefore, the first electrodes 120 form electric field fluxes due to an electrical signal applied from the signal source Vsig, and the second electrodes 140 are connected to the charge amplifier of the detector 300 and sense a touch of an object. When the second electrodes 140 are connected to the charge amplifier of the detector 300, the second electrodes 140 are kept at the electric potential of the charge amplifier due to the virtual short of the charge amplifier.

During the first phase T, the signal source Vsig applies square pulse V1a to one 1a electrode 120a and applies a square pulse V1b out of phase, that is, having a phase difference of 180 degrees, with the square pulse V1a to one 1b electrode 120b having a second electrode 140 interposed between the 1a electrode 120a and the 1b electrode 120b. In this way, when electrical signals out of phase with each other are applied to the 1a electrode 120a and the 1b electrode 120b, the influence of an electric field flux formed by the 1a electrode 120a and the influence of an electric field flux formed by the 1b electrode 120b balance out at the midpoint between the 1a electrode 120a and the 1b electrode 120b, that is, in a second electrode area. As shown in the drawing, each of the 1a electrodes 120a and each of the second electrodes 140 form a capacitor having a predetermined capacitance, and also each of the 1b electrodes 120b and each of the second electrodes 140 form a capacitor having a predetermined capacitance. In capacitors formed in this way, the 1a electrodes 120a, the 1b electrodes 120b, and the second electrodes 140 serving as electrodes have the same area, and the same material is used as dielectrics of the capacitors. Therefore, the capacitors have the same capacitance.

When the signal source Vsig applies a square pulse having a rising edge to the 1a electrode 120a, a current flows to a second electrode 140 that is another electrode of the capacitor connected to the ground potential. When the current is $i_1$, the current $i_1$ is expressed as shown in Equation 1 below.

$$i_1 = C\frac{dV}{dt}, \quad [\text{Equation 1}]$$

$$\begin{cases} V: \text{ driving signal applied to first electrode} \\ C: \text{ capacitance} \end{cases}$$

Likewise, a pulse out of phase with the pulse applied to the 1a electrode 120a, that is, a square pulse having a falling edge, is applied to the 1b electrode 120b. When a current flowing to a capacitor formed between the second electrode 140 and the 1b electrode 120b is $i_2$, the current is expressed as $$i_2 = -C\frac{dV}{dt},$$

and thus the two currents balance out at the second electrode 140 to which $i_1$ and $i_2$ are simultaneously applied.

After a half period of a pulse applied to the first electrodes 120, a pulse having a falling edge is applied to the 1a electrode 120a, and a pulse having a rising edge is applied to the 1b electrode 120b, so that currents induced by the respective pulses balance out at the second electrode 140 in the same way as described above. In other words, capacitors formed of one electrode connected to the detector 300 and adjacent electrodes connected to the signal source Vsig operate complementarily. Therefore, when the object O is not close enough to shunt an electric field flux or there is no object, no or a negligible current flows to the second electrode 140, and thus it is possible to detect that an object is not adjacent or no touch has been made by an object.

When a touch is made by the object O as shown in FIG. 5, waveforms out of phase with each other are respectively applied to each 1a electrode 120a and each 1b electrode 120b during the first phase T1 as shown in FIG. 4. Therefore, pulses out of phase with each other are also applied to a 1a electrode 120a and a 1b electrode 120b adjacent to the object O. However, the distance between the object O and the 1a electrode 120a is the same as the distance between the object O and the 1b electrode 120b, and thus the object O shunts the same amount of an electric field flux formed by a pulse applied to the 1a electrode 120a and an electric field flux formed by a pulse applied to the 1b electrode 120b. In this way, when an object touches a point at the same distance from two electrodes to which signals out of phase with each other are applied, it is impossible to detect the touch of the object. This is because an object shunts the same amount of electric field fluxes of two capacitors operating complementarily, the amounts of reduction in the current $i_1$ and the current $i_2$ are the same, and the two currents $i_1$ and $i_2$ balance out at a second electrode 140.

The controller 200 connects the first electrodes 120 that have been connected to the signal source Vsig to the detector 300 at predetermined periods, and performs switching so that the second electrodes 140 that have been connected to the detector 300 are connected to the signal source Vsig. After the switching is performed, the signal source Vsig applies waveforms out of phase with each other respectively to 2a electrodes 140a and 2b electrodes 140b as shown in the second phase T2 of FIG. 4, and the first electrodes 120 are electrically connected to the detector 300 (see grey portions of T2 in FIG. 4). In the second phase T2, the object O is placed on a 2a electrode 140a, and thus the object O shunts a larger amount of electric field formed by a 2a electrode 140a than an electric field flux formed by a 2b electrode 140b. Therefore, from a capacitor C1 formed of the 2a electrode 140a and the 1a electrode 120a and a capacitor C2 formed of the 2a electrode 140a and the 1b electrode 120b, a current is generated by the shunted electric field flux, and the value of the current generated in this way differ from the value of a current generated in a capacitor C2' (도면에 없습니다) formed of the 2b electrode 140b and the 1b electrode 120b. In other words, the complementarity of currents is destroyed by the touch of the object O, and currents do not balance out, so that a current is generated in the 1b electrode 120b.

Likewise, the complementarity of currents is destroyed by the object O between the other capacitor C1 formed of the 2a electrode 140a and a capacitor C1' (도면에 없습니다 도면에 없습니다), and thus a current is also generated at the 1a electrode 120a. Therefore, the detector 300 can detect the current generated in this way and generate a signal providing a notification of a touch of an object.

As an example, it is possible to model a case in which an electric field flux is shunted by the object O as a case in which the permittivity of the dielectric constituting the capacitors C1 and C2 is reduced. When a pulse applied to an electrode on which the object O is placed has a phase of 0 degrees and a pulse applied to an adjacent electrode having an electrode connected to the detector 300 interposed between the electrode and the adjacent electrode is 180 degrees, the permittivities of the capacitors C1 and C2 formed of the electrode on which the object O is placed are reduced, and thus the capacitances of the capacitors C1 and C2 are reduced compared to the capacitors C1' and C2' whose electric field fluxes are not shunted by the object O. Therefore, in currents generated at the 1a electrode 120a and the 1b electrode 120b connected to the detector 300, current components formed by the pulses out of phase with each other are dominant, and the currents are out of phase with a pulse applied to the electrode on which the object O is placed.

As described above, when the apparatus for detecting an adjacent object is in the idle mode, single frame scanning consists of the first phase T1 in which the signal source Vsig is connected to the first electrodes 120 and the detector 300 is connected to the second electrodes 140 so as to detect an object, and the second phase T2 in which the detector 300 is connected to the first electrodes 120 and the signal source Vsig is connected to the second electrodes 140. The frame scanning is performed at a uniform refresh rate. Unlike in the related art, the frame scanning is performed not to detect touch coordinates but only to detect whether or not a touch is made by an object or object is adjacent.

Therefore, to detect touch coordinates, scanning is performed as many times as the number of the third electrodes 160 disposed on the lower surface of the substrate 180. In the related art, scanning is performed as many times as the number of the third electrodes 160 to detect whether or not an object is adjacent to the apparatus, whereas this exemplary embodiment involves only two times of scanning for the first electrodes 120 and the second electrodes 140 so that unnecessary power consumption can be reduced. In addition, without sacrificing speed in detecting a touch of an object and reacting to the touch, it is possible to reduce power consumption in the idle mode. Furthermore, without additional components to components used in the active mode, it is possible to detect an object with low power, and thus a chip size does not increase.

In the exemplary embodiment described above, only a configuration in which first electrodes and second electrodes are alternately connected to a signal source and a detector has been shown and described as an example. However, the configuration is intended for convenience of description, and an electrode which is connected to the signal source and to which a pulse having a phase of 0 degrees is applied, an electrode to which a pulse having a phase of 180 degrees is applied, and a second electrode connected to the detector may be plural in number. In other words, by applying a pulse having a phase of 0 degrees to an A electrode group consisting of two or more electrodes adjacent to each other, connecting a B electrode group consisting of two or more electrodes disposed adjacent to the A electrode group to the detector, and applying a pulse having a phase of 180 degrees to a C electrode group disposed adjacent to the B electrode group, it is possible to detect an object as in the exemplary embodiment described above.

Figure 6:
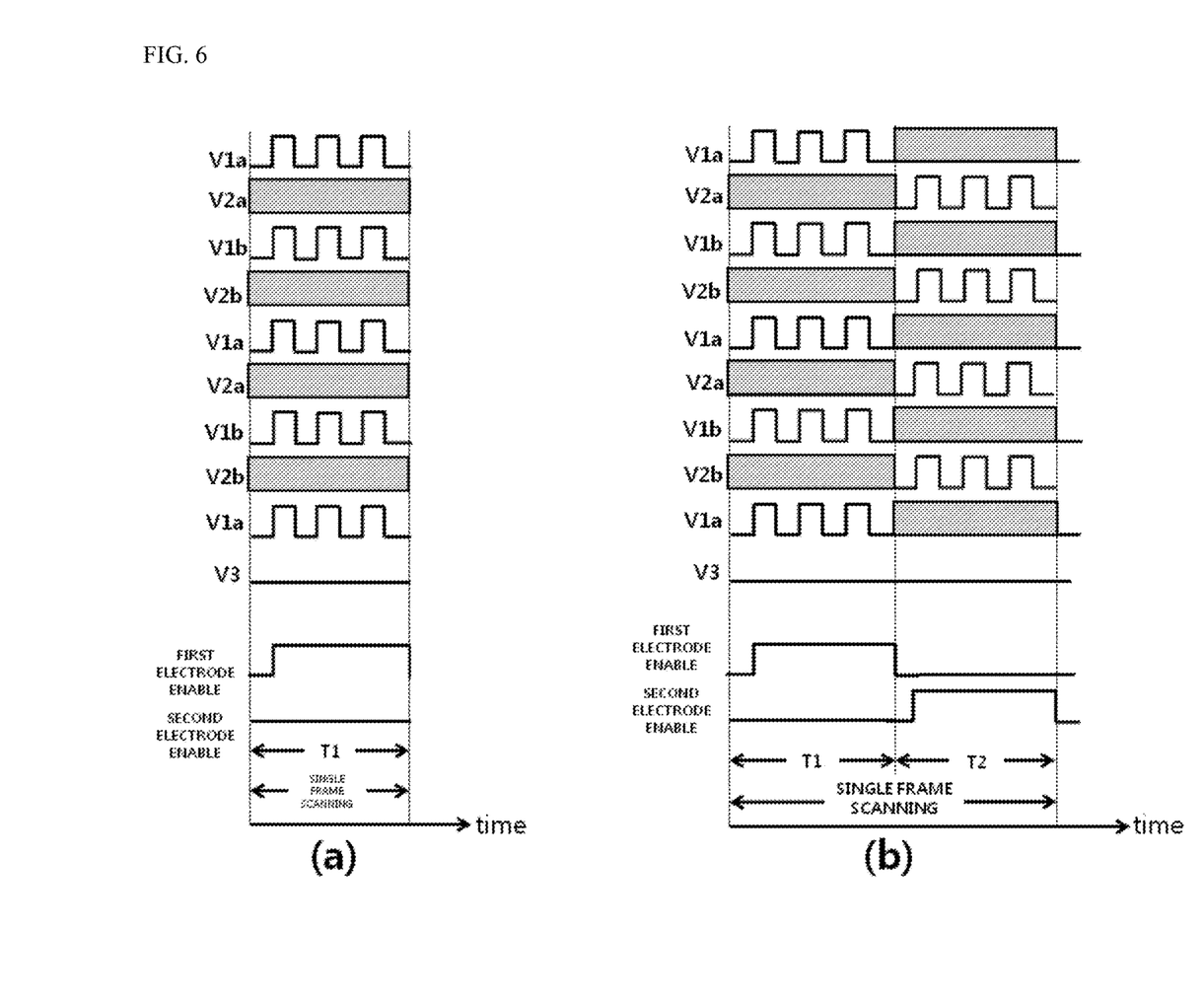
FIG. 6 shows waveforms of signals applied to the first electrodes, the second electrodes, and the third electrodes to detect an object according to another exemplary embodiment.

Operation of the apparatus for detecting an adjacent object according to another exemplary embodiment will be described with reference to FIGS. 6 and 7. For clearness and conciseness, the same description as in the exemplary embodiment described above may be omitted. FIG. 6 is a diagram illustrating a method of detecting an adjacent object according to this exemplary embodiment. In FIG. 6, waveforms V1a and V1b are waveforms applied to the first and second electrodes 120 and 140 of FIG. 7 respectively, and a waveform V3 denotes that the ground potential is applied to third electrodes 160. Also, "first electrode enable" denotes a period in which the first electrodes 120 receive an electrical signal from the signal source Vsig and form electric fields, and "second electrode enable" denotes a period in which the second electrodes 140 receive an electrical signal from the signal source Vsig and form electric fields. Grey areas denote periods in which the corresponding electrodes are connected to the detector 300 to perform object sensing. Like in the exemplary embodiment described above, the third electrodes 160 disposed on the lower surface of the substrate 180 are electrically connected to a low-impedance power source or a ground potential and receive a ground signal as shown in the drawing. However, waveforms applied to the first and second electrodes 120 and 140 differ in phase from waveforms in the exemplary embodiment described above.

In this exemplary embodiment, the controller 200 electrically connects the first electrodes 120 with the signal source Vsig. The first electrodes 120 receive signals in phase with each other from the signal source Vsig and form electric field fluxes. In an exemplary embodiment, in-phase square pulses having no phase difference from each other are applied to first electrodes 120 having a second electrode 140 interposed between the first electrodes 120. Like in the exemplary embodiment described above, when pulses out of phase with each other are applied to first electrodes 120$a$ and 120$b$ facing each other with the second electrode 140 interposed between the first electrodes 120$a$ and 120$b$, the influences of electric field fluxes formed by the first electrodes 120$a$ and 120$b$ balance out around the second electrode 140 that is the midpoint between the first electrodes 120$a$ and 120$b$. The adjacent electric field fluxes attract each other, and thus have influences onto a relatively low height. However, when pulses in phase with each other are applied to the facing first electrodes 120 as in this exemplary embodiment, the electric field fluxes repulse each other and drastically rise. Therefore, in this exemplary embodiment, the electric field fluxes formed by the first electrodes 120 receiving signals in phase with each other repulse each other and drastically rise as high as can be shunted by an object hovering over the substrate 180. Therefore, the second electrode 140 transmits a current generated by a change in an electric field flux shunted by an object hovering over the substrate 180 to the detector 300, and the detector 300 performs signal processing on the detected current, thereby detecting whether the object hovers above the touch panel 100, approaches the substrate 180, or moves apart from the substrate 180.

Figure 7:
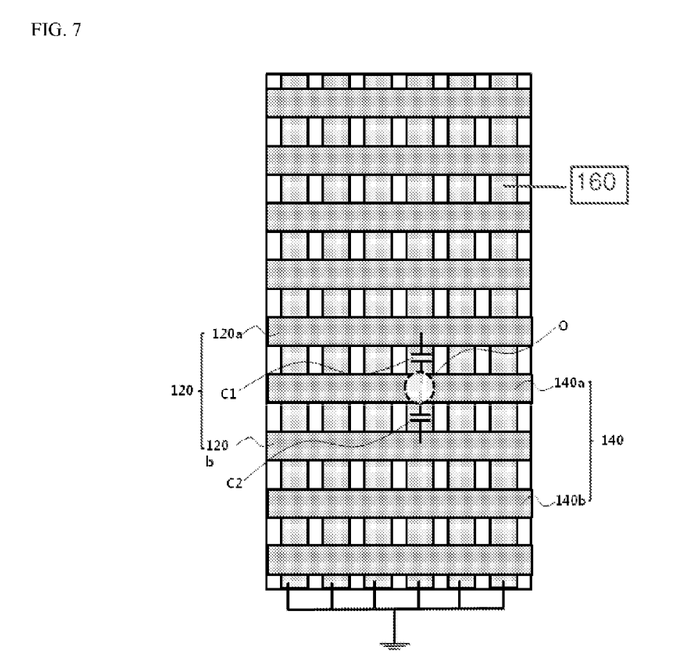
FIG. 7 shows a case in which an object is placed on a touch panel.

Referring to FIG. 7, the first electrodes 120 receive in-phase signals from the signal source Vsig, and form electric field fluxes rising up to a predetermined height. As mentioned above, the second electrodes 140 form capacitors together with the first electrodes 120, and are electrically connected to the detector 300 by the controller 200. A predetermined AC waveform is applied to the first electrodes 120 forming the capacitors, and an electric potential applied to the non-inverting terminal of the charge amplifier due to virtual short of the detector 300 is applied to the second electrodes 140. For this reason, a current flowing from a 1$a$ electrode 120$a$ to a 2$a$ electrode 140$a$ is generated in a capacitor C1, and also a current flowing from a 1$b$ electrode 120$b$ to a 2$b$ electrode 140$b$ is generated in a capacitor C2. Therefore, when no object is adjacent to the upper surface of the touch panel 100 or is as close to the upper surface as can shunt an electric field flux, a current applied from the second electrodes 140 to the detector 300 is the sum of currents flowing from the respective second electrodes 140 connected to the detector 300.

On the other hand, when an object O is as high above the 2$a$ electrode 140$a$ as can shunt an electric field flux, the object shunts electric field fluxes formed by the 1$a$ electrode 120$a$ and the 1$b$ electrode 120$b$. Therefore, a current flowing through the capacitor C1 formed of the 1$a$ electrode 120$a$ and the 2$a$ electrode 140$a$ and the capacitor C2 formed of the 1$b$ electrode 120$a$ and the 2$b$ electrode 140$b$ is reduced in proportion to the electric field flux shunted by the object O. In the exemplary embodiment described above, when first electrodes or second electrodes receive electrical signals out of phase with each other and operate complementarily, currents flowing in the 2$a$ electrode balance out, and it is impossible to sense an influence of an object. However, in this exemplary embodiment, currents do not balance out. Therefore, the current reduced in proportion to the amount of the electric field flux shunted by the object O flows in the 2$a$ electrode 140$a$ and is applied to the detector 300.

For this reason, in an exemplary embodiment, it is possible to detect whether or not an object is adjacent to the touch panel 100 by comparing a signal formed by a current flowing in the 2$a$ electrode 140$a$ with a signal formed by a current flowing in another second electrode 140. In another exemplary embodiment, currents flowing in the second electrodes 140 are summed and compared with a predetermined current value, and when the sum is the predetermined current value or less, it is possible to determine that an object is adjacent to the touch panel 100. Furthermore, when the current flowing in the 2$a$ electrode 140$a$ gradually increases, the influence of an object is gradually reduced, and it is possible to determine that the object gradually moves apart from the touch panel 100. On the other hand, when the current flowing in the 2$a$ electrode 140$a$ gradually decreases, it is possible to determine that an object gradually approaches the touch panel 100.

In this exemplary embodiment, currents do not balance out, and it is unnecessary to divisionally perform single frame scanning in two periods. Therefore, as shown in FIG. 6A, single frame scanning is performed in one period so that power consumed in the idle mode can be further reduced. In another exemplary embodiment, by divisionally performing single frame scanning in two periods as shown in FIG. 6B, it is possible to use the driving method and structure according to the previous embodiment.

In this exemplary embodiment, when signals in phase with each other are applied to electrodes alternately disposed with an electrode interposed the electrodes, influences of electric field fluxes formed by the signals extends farther than those of electric field fluxes in the previous embodiment. Therefore, when an electric field flux formed in this way is shunted by an object, electrodes other than the corresponding electrode can detect the influence of the electric field flux shunted by the object even if the object does not come in direct contact with the apparatus but hovers over the apparatus. In addition, it is possible to detect approach or separation of an object.

In this exemplary embodiment, unlike the related art, it is unnecessary to detect touch coordinates of an object. Therefore, without performing scanning as many times as the number of driving electrodes, it is possible to detect approach or separation of an object with only single scanning, and thus unnecessary power consumption can be reduced. In addition, without sacrificing speed in detecting a touch of an object and reacting to the touch, it is possible to reduce power consumption in the idle mode. Furthermore, without additional components to components used in the active mode, it is possible to detect an object with low power, and thus a chip size does not increase. Moreover, it is possible to detect an approaching state that is a state before a touch of an object or a separate state that is a state after a touch of an object, and detect whether an object approaches a touch pad over time or whether an object moves apart from the touch pad over time. Therefore, it is possible to more efficiently control driving of an electronic device.

In this exemplary embodiment, like in the previous exemplary embodiment, only a configuration in which first electrodes and second electrodes are alternately connected to a signal source and a detector has been shown and described as an example. However, the configuration is intended for convenience of description, and an electrode which is connected to the signal source and to which a pulse having a phase of 0 degrees is applied may be plural in number.

Figure 8:
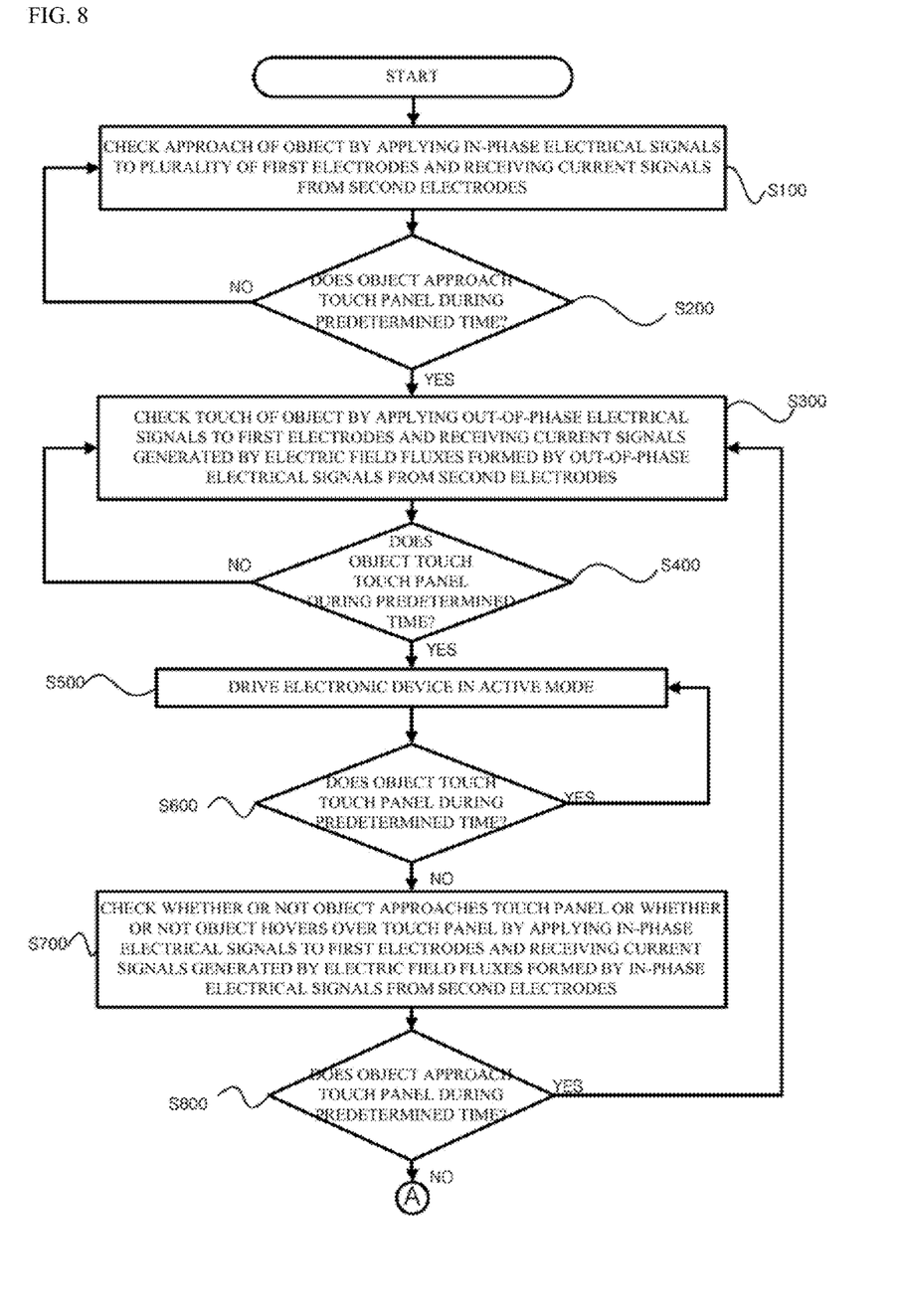
FIGS. 8 and 9 are flowcharts schematically illustrating a method of driving an electronic device having a touch panel according to an exemplary embodiment.
Figure 9:
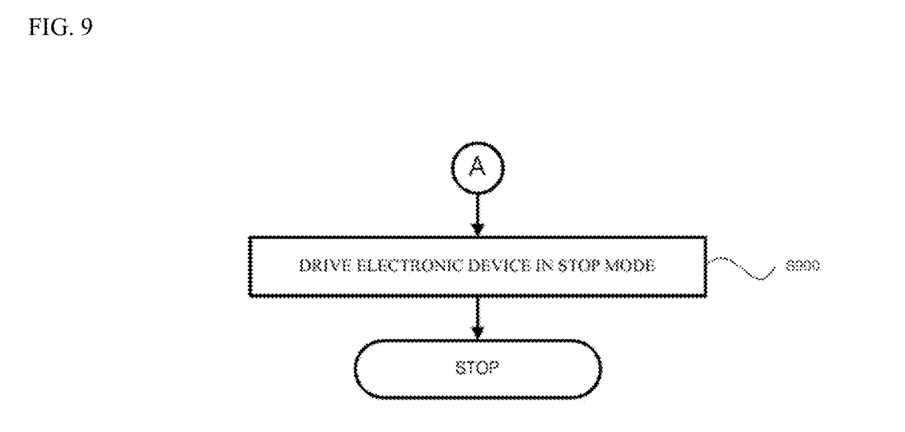

With reference to FIGS. 8 and 9, a method of driving an electronic device having a touch panel according to an exemplary embodiment will be described. For clearness and conciseness, descriptions of this exemplary embodiment that is the same as that of the exemplary embodiments described above may be omitted. FIGS. 8 and 9 are flowcharts schematically illustrating a method of driving an electronic device according to an exemplary embodiment. Referring to FIGS. 8 and 9, as an example, when no input is applied to an electronic device in steps S100 and S200, the electronic device checks approach of an object. Therefore, as in the exemplary embodiment described above, electronic signals in phase with each other are applied to the first electrodes disposed to have the second electrodes interposed between the first electrodes. When electronic signals in phase with each other are applied to the first electrodes, as described above, electronic field fluxes formed by the first electrodes repulse each other and rise as high as can be shunted by an object closely hovering over the touch panel.

In an exemplary embodiment, to detect an object, frame scanning for detecting an adjacent object is performed in one period, so that power consumed in the idle mode can be further reduced. In another exemplary embodiment, frame scanning for detecting an adjacent object is divisionally performed in two periods, so that the driving method and structure according to the previous exemplary embodiment can be used.

When approach of an object is detected, the electronic device checks a touch of the object (S300 and S400). When an approaching object or a hovering object is detected, it is possible to determine that a user will soon perform a predetermined operation using the electronic device, and the electronic device prepares for check of a touch input for applying an input thereto. Therefore, when approach of an object is detected, electrical signals out of phase with each other are applied to the first electrodes, and current signals generated by electric field fluxes formed by the electrical signals out of phase with each other are received from the second electrodes, so that a touch of the object is checked. When the object is placed on any one electrode, a change in a current caused by the object shunting an electric field flux as described above may not be detected. Therefore, at predetermined periods, the electronic device disconnects the first electrodes from a signal source, connects the first electrodes to a detector, disconnects the second electrodes from the detector, and connects the second electrodes to the signal source. Detection of a touch of an object that consists of two phases in this way is performed at a predetermined frequency.

When a touch of the object is detected, the electronic device is driven in the active mode and receives information, such as touch coordinates and touch strength of the object (S500).

In an exemplary embodiment, when no touch of an object is detected for a first predetermined time in the active mode, the electronic device enters the stop mode. However, since there may be a touch of the object after no touch is detected for a certain time, the electronic device needs to detect whether or not there is a touch for a second predetermined time without immediately entering the stop mode. Therefore, when no touch of the object is detected for the first predetermined time, detection of a touch of the object is performed by applying electrical signals out of phase with each other to the first electrodes and receiving current signals generated by electric field fluxes formed by the electrical signals out of phase with each other from the second electrodes (S600). When a touch of the object is detected at this time, it is possible to determine that the user attempts to drive the electronic device, and thus the electronic device is driven in the active mode again.

On the other hand, when no touch of the object is detected for the second predetermined time, whether or not the object approaches the touch panel or whether or not the object hovers over the touch panel is detected by applying electrical signals in phase with each other to the first electrodes and receiving current signals generated by electric field fluxes from the second electrodes (S700). In other words, when it is impossible to detect a touch of the object, whether or not the object hovers over the substrate is detected. When the object hovers over the substrate at a predetermined distance, a touch may be made by the object, and thus it is necessary to check whether or not the object hovers over the substrate for a third predetermined time. On the other hand, when it is checked that no object hovers over the substrate during the third predetermined time, the electronic device is driven in the stop mode (S900).

When object detection in the idle mode is performed according to this exemplary embodiment, single frame scanning involves only two sensing operations. Therefore, even when a refresh rate is kept at the same value as in the active mode, it is possible to obtain higher power efficiency than in the active mode and obtain an improved initial reaction speed compared to the related art for implementing low power consumption by lowering a refresh rate.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for detecting an adjacent object, comprising:
 a substrate;
 a plurality of first electrodes including one or more 1*a* electrodes and one or more 1*b* electrodes disposed to extend in a first direction on one surface of the substrate;
 a plurality of second electrodes disposed alternately and in parallel with the first electrodes on the surface of the substrate to form capacitors together with the first electrodes;
 a signal source configured to generate electrical signals;
 a detector configured to detect current signals output when the electrical signals are applied to the capacitors; and
 a controller configured to connect the signal source to the first electrodes and the detector to the second electrodes,
 wherein the signal source applies out of phase signals with each other to the 1*a* electrodes and the 1*b* electrodes.

2. The apparatus of claim 1, wherein the second electrodes include one or more 2*a* electrodes and one or more 2*b* electrodes, and
 the controller performs, at a predetermined frequency, one cycle including a first step of connecting the 1*a* electrodes and the 1*b* electrodes to the signal source to apply signals out of phase with each other to the 1a electrodes and the 1b electrodes, and connecting the second electrodes to the detector, and a second step of connecting the first electrodes to the detector, and connecting the 2a electrodes and the 2b electrodes to the signal source to apply signals out of phase with each other to the 2a electrodes and the 2b electrodes.

3. The apparatus of claim 2, wherein the detector detects current signals applied from the second electrodes connected to the detector in the first step, and detects current signals applied from the first electrodes connected to the detector in the second step.

4. The apparatus of claim 1, wherein each of one or more second electrodes is interposed between each of the 1a electrodes and each of the 1b electrodes.

5. The apparatus of claim 1, wherein the one or more 1a electrodes neighbor each other and constitute an A electrode group, and
the one or more 1b electrodes neighbor each other and constitute a B electrode group.

6. The apparatus of claim 5, wherein at least one second electrode is interposed between the A electrode group and the B electrode group.

7. The apparatus of claim 1, wherein third electrodes extending in a second direction perpendicular to the first direction and arranged in parallel with each other are disposed on another surface of the substrate, and are connected to a low-impedance power source or a ground potential.

8. The apparatus of claim 1, wherein the signal source applies at least one electrical signal among a step wave, a square pulse, a sinusoidal pulse, a triangular pulse, and a linear superposition thereof.

9. The apparatus of claim 1, wherein an object to be detected is detected by converting a current signal generated due to a change in an electric field flux caused when the electric field flux formed by an electrical signal at a first electrode connected to the signal source is shunted by the object, into a voltage signal.

10. The apparatus of claim 1, wherein the detector includes a charge amplifier which receives and converts the current signals into predetermined voltage signals.

11. An apparatus for detecting an adjacent object, comprising:
a substrate;
a plurality of first electrodes including one or more 1a electrodes and one or more 1b electrodes disposed to extend in a first direction on one surface of the substrate;
a plurality of second electrodes disposed alternately and in parallel with the first electrodes on the surface of the substrate to form capacitors together with the first electrodes;
a signal source configured to generate electrical signals;
a detector configured to detect current signals output when the electrical signals are applied to the capacitors; and
a controller configured to connect the signal source to the first electrodes and the detector to the second electrodes, wherein the signal source applies signals in phase with each other to the 1a electrodes and the 1b electrodes.

12. The apparatus of claim 11, wherein the controller performs, at a predetermined frequency, a step of connecting the first electrodes to the signal source and the second electrodes to the detector.

13. The apparatus of claim 11, wherein each of one or more second electrodes is interposed between each of the 1a electrodes and each of the 1b electrodes.

14. The apparatus of claim 11, wherein the one or more 1a electrodes neighbor each other and constitute an A electrode group, and
the one or more 1b electrodes neighbor each other and constitute a B electrode group.

15. The apparatus of claim 14, wherein at least one second electrode is interposed between the A electrode group and the B electrode group.

16. The apparatus of claim 11, wherein third electrodes extending in a second direction perpendicular to the first direction and arranged in parallel with each other are disposed on another surface of the substrate, and are connected to a low-impedance power source or a ground potential.

17. The apparatus of claim 11, wherein the signal source applies at least one electrical signal among a step wave, a square pulse, a sinusoidal pulse, a triangular pulse, and a linear superposition thereof.

18. The apparatus of claim 11, wherein an object to be detected is detected by converting a current signal generated due to a change in an electric field flux caused when the electric field flux formed by an electrical signal at a first electrode connected to the signal source is shunted by the object, into a voltage signal.

19. The apparatus of claim 11, wherein the detector includes a charge amplifier which receives the current signals and converts the current signals into predetermined voltage signals.

20. A method for detecting an adjacent object, comprising:
(a) applying electrical signals in phase with each other to at least one 1a electrode and at least one 1b electrode disposed to extend in a first direction on one surface of a substrate;
(b) receiving current signals from a plurality of second electrodes disposed alternately and in parallel with the 1a electrode and the 1b electrode on the surface of the substrate to form capacitors together with the 1a electrode and the 1b electrode; and
(c) converting the received current signals into voltage signals to detect an object adjacent to the substrate.

21. The method of claim 20, wherein one cycle including step (a) and step (b) is performed at a predetermined frequency.

22. The method of claim 20, wherein the applying of the electrical signals is performed by applying at least one electrical signal among a step wave, a square pulse, a sinusoidal pulse, a triangular pulse, and a linear superposition thereof.

23. The method of claim 20, wherein the method is performed by connecting a low-impedance power source or a ground potential to third electrodes extending in a second direction perpendicular to the first direction and arranged in parallel with each other on another surface of the substrate.

24. A method for detecting an adjacent object, comprising:
(a) applying electrical signals out of phase with each other to at least one 1a electrode and at least one 1b electrode disposed to extend in a first direction on one surface of a substrate;
(b) receiving current signals from a plurality of second electrodes disposed alternately and in parallel with the 1a electrode and the 1b electrode on the surface of the substrate to form capacitors together with the 1a electrode and the 1b electrode; and
(c) converting the received current signals into voltage signals to detect an object adjacent to the substrate.

25. The method of claim 24, wherein the second electrodes include at least one 2a electrode and at least one 2b electrode, and
further comprising, after step (c):
(d) applying electrical signals out of phase with each other to the 2a electrode and the 2b electrode; and (e) receiving current signals from the 1*a* electrode and the 1*b* electrode.

26. The method of claim 25, wherein one cycle including a first step including step (b) and step (c) and a second step including step (d) and step (e) is performed at a predetermined frequency.

27. The method of claim 24, wherein the applying of the electrical signals is performed by applying at least one electrical signal among a step wave, a square pulse, a sinusoidal pulse, a triangular pulse, and a linear superposition thereof.

28. The method of claim 24, wherein the method is performed by connecting a low-impedance power source or a ground potential to third electrodes extending in a second direction perpendicular to the first direction and arranged in parallel with each other on another surface of the substrate.

29. A method of driving an electronic device, comprising:
(a) applying electrical signals in phase with each other to a plurality of first electrodes disposed to extend in a first direction on one surface of a substrate and receiving current signals from a plurality of second electrodes disposed alternately and in parallel with the first electrodes on the surface of the substrate to detect approach of an object;
(b) when approach of an object is detected, applying electrical signals out of phase with each other to the first electrodes and receiving current signals generated by electric field fluxes formed by the electrical signals out of phase with each other from the second electrodes to detect a touch of the object; and
(c) when a touch of the object is detected, driving the electronic device in an active mode.

30. The method of claim 29, wherein step (a) further includes, after applying the in-phase signals to the first electrodes and receiving the current signals from the second electrodes, applying in-phase signals to the second electrodes and receiving current signals from the first electrodes to detect approach of an object.

31. The method of claim 29, wherein step (b) further includes, after applying the out-of-phase signals to the first electrodes and receiving the current signals from the second electrodes, applying out-of-phase signals to the second electrodes and receiving current signals from the first electrodes to detect a touch of the object.

32. A method of driving an electronic device, comprising:
(a) applying electrical signals out of phase with each other to a plurality of first electrodes disposed to extend in a first direction on one surface of a substrate and receiving current signals from a plurality of second electrodes disposed alternately and in parallel with the first electrodes on the surface of the substrate to detect a touch of an object;
(b) when no touch of an object is detected for a predetermined time, applying electrical signals in phase with each other to the first electrodes and receiving current signals generated by electric field fluxes formed by the electrical signals in phase with each other from the second electrodes to detect approach of the object; and
(c) when no approach of the object is detected for a predetermined time, driving the electronic device in a stop mode.

33. The method of claim 32, wherein step (a) further includes, after applying the out-of-phase signals to the first electrodes and receiving the current signals from the second electrodes, applying out-of-phase signals to the second electrodes and receiving current signals from the first electrodes to detect a touch of an object.

34. The method of claim 32, wherein step (b) further includes, after applying the in-phase signals to the first electrodes and receiving the current signals from the second electrodes, applying in-phase signals to the second electrodes and receiving current signals from the first electrodes to detect approach of the object.

* * * * *